United States Patent Office

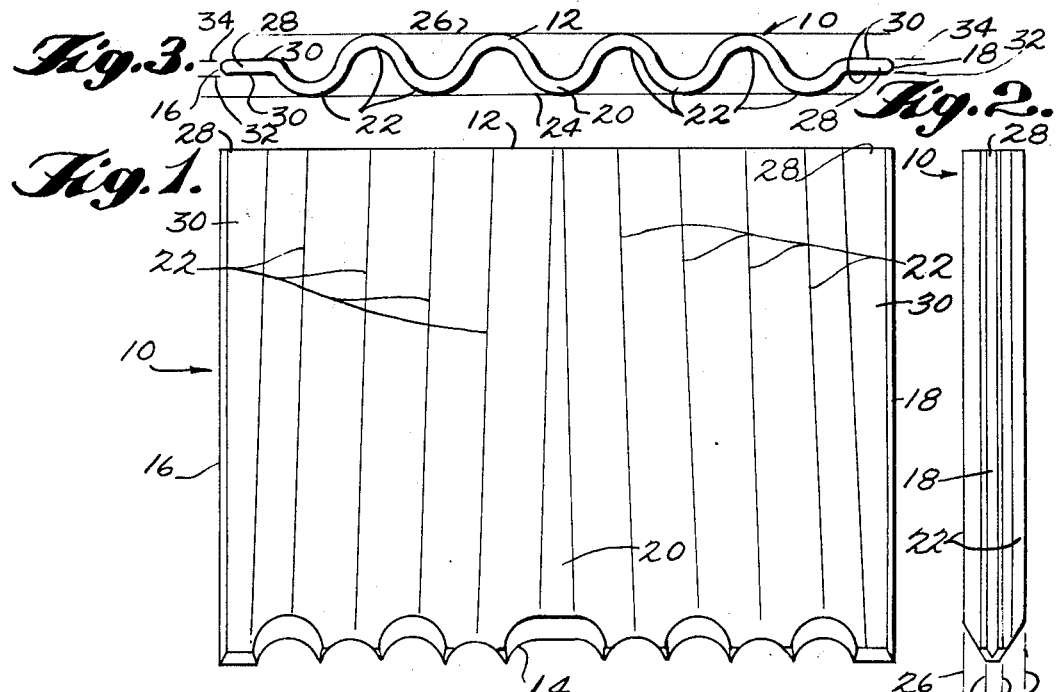
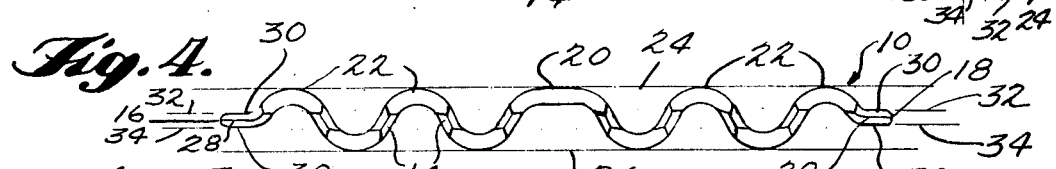
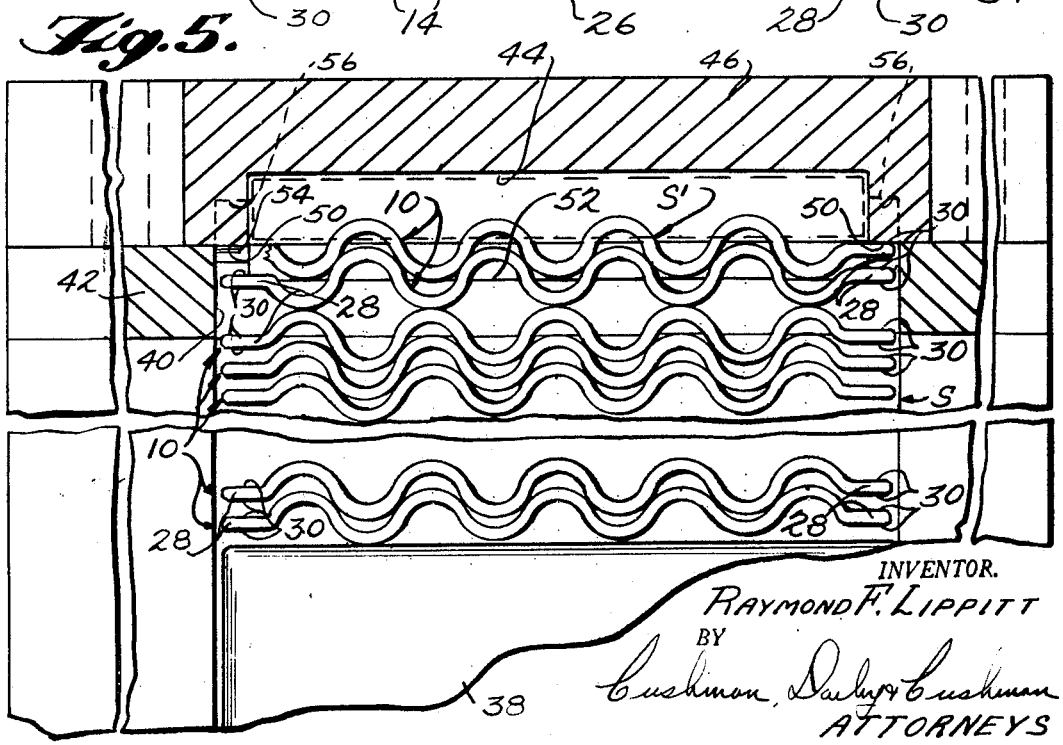

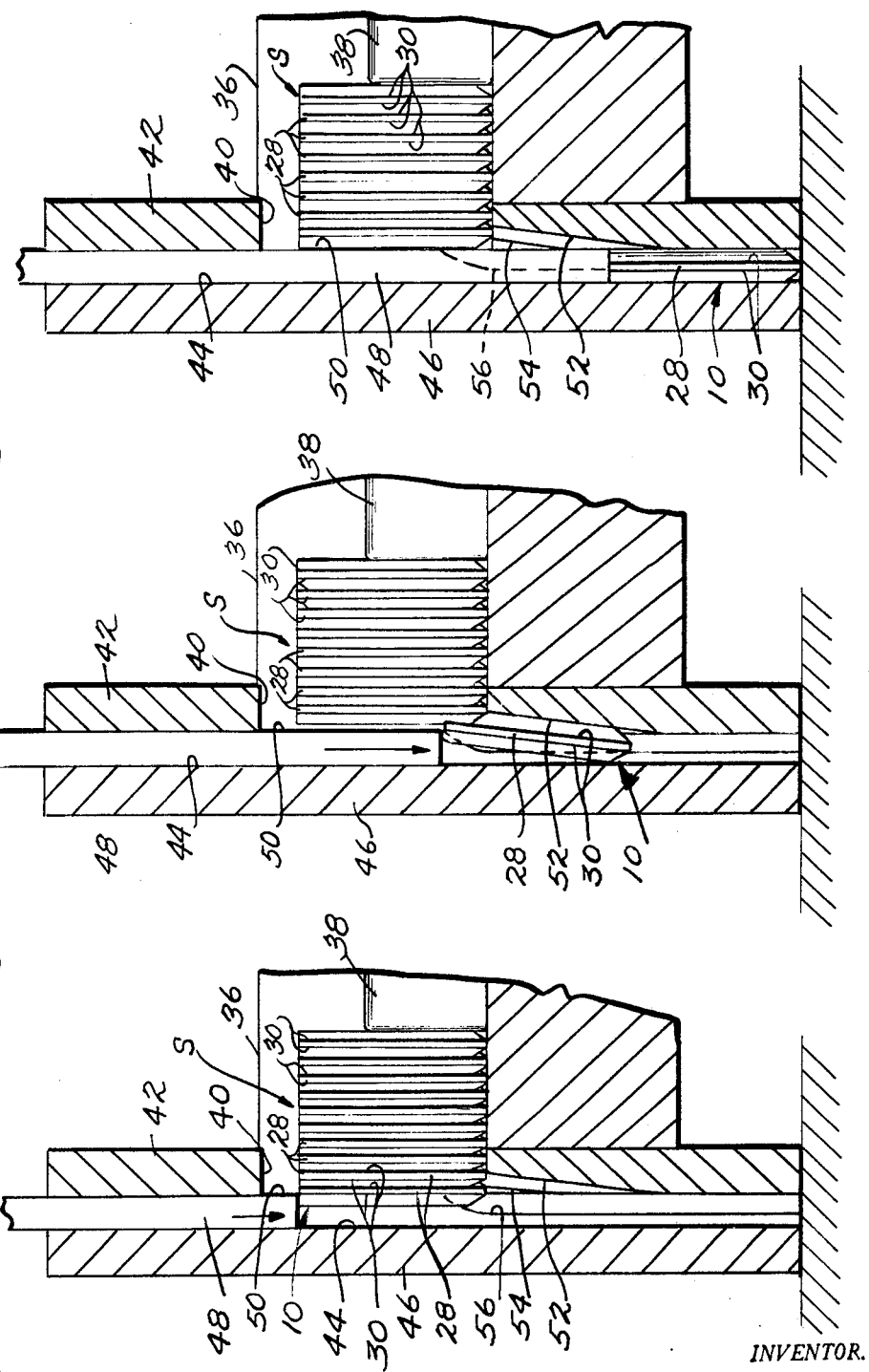

3,507,384
Patented Apr. 21, 1970

3,507,384
CORRUGATED FASTENER STRUCTURE FOR USE IN FASTENER DRIVING DEVICE
Raymond F. Lippitt, Bethesda, Md., assignor to Textron Inc., a corporation of Delaware
Filed Oct. 23, 1967, Ser. No. 677,224
Int. Cl. B65d 83/00; F16b 15/00; B25c
U.S. Cl. 206—56                                    4 Claims

ABSTRACT OF THE DISCLOSURE

The specification discloses a fastener stick for use in a fastener driving device comprising a plurality of individual corrugated fasteners of similar construction secured together in row formation with their corrugations similarly oriented in abutting nested relation, each of the corrugated fasteners having flat portions at the ends thereof providing opposed surfaces of relatively narrow width positioned centrally with respect to the corrugation thickness thereof either of which may be oriented in leading or trailing fashion in the magazine assembly of the fastener driving device so as to engage the stop surfaces provided therein when in the position of the leading corrugated fastener of the stick within the magazine assembly to thereby present the leading portion only of the corrugations thereof within the trailing portion of the drive track of the fastener driving device for engagement by the fastener driving element during its drive stroke and for movement therewith after engagement during which the leading corrugated fastener is initially stripped from the next adjacent nested fastener, cammed into alignment with the drive track and fastener driving element and finally driven into the workpiece.

BACKGROUND OF THE INVENTION

This invention relates to corrugated fasteners and more particularly to corrugated fasteners packed in stick formation for use in power operated fastener driving devices.

There are many power operated fastener driving devices presently available on the commercial market having magazine assemblies for accommodating fasteners such as staples and T head nails. Fasteners of this type are conventionally packaged in stick formation. A conventional fastener stick includes a multiplicity of fasteners assembled in coextensive abutting row relationship and secured in such assembled relationship by any suitable means, such as tape, an adhesive or the like. In this way, a multiplicity of fasteners are packaged as a unit which can be easily handled both prior to use in the fastener driving device and when necessary to reload the fastener magazine of the fastener driving device.

A characteristic of conventional fastener sticks, consisting either of staples or of T head nails, is that each fastener is of substantially uniform thickness and extends transversely across the stick making it a relatively simple matter to feed the leading fastener of the stick into the drive track of the fastener driving device to be stripped off of the stick during the drive stroke of the driving element of the device.

Corrugated fasteners, have been known for many years and have widespread availability either in bulk for use individually in conjunction with hand tools or in large continuous coils in conjunction with heavy duty automatic machines capable of cutting off individual sections from the coil and driving successive cutoff individual sections into the desired workpiece. Efforts have been made over the years to package conventional corrugated fasteners in stick formation for use in conventional power operated fastener driving devices of the type adapted to drive staple sticks and T head nail sticks. However, because the corrugations in corrugated fasteners have a longitudinal component of extension, a problem is presented in feeding a stick of corrugated fasteners to the drive track so that the leading fastener can be properly stripped off and driven. That is, it is not practical to provide the driving element with a corrugated configuration corresponding to that of the leading fastener so that during the drive stroke the leading fastener may be simply stripped off, as is the case with staples and T head nails.

One solution to this problem has been to assemble corrugated fasteners in stick formation with alternate fasteners oriented in opposite directions so that the outer extremities or ribs of each pair of adjacent fasteners are disposed in an abutting relation. With a stick formation of this type, the driver element can have a rectangular configuration equal to the length of the corrugated fastener and a width equal to the thickness of the corrugated fastener measured between the outer extremities of the corrugation on each side. A corrugated fastener stick of this type is thus capable of being fed and driven in a manner similar to that of conventional staple and T head nail sticks. However, a distinct disadvantage of this type of corrugated fastener stick is that a minimum number of corrugated fasteners are included within the stick on a per unit length basis as compared with a corrugated fastener stick wherein all of the fasteners are oriented in the same direction and the corrugations are nested.

Another disadvantage of the alternately oppositely oriented corrugated fastener stick is presented as a result of the orientation of the outermost corrugated fasteners of the stick formation. In conventional practice, the stick is assembled so that the corrugations of the outermost fasteners of the stick are oppositely oriented. This insures that when a new stick is loaded into a magazine assembly which has a small number of corrugated fasteners from the previously depleted stick remaining therein, the leading fastener of the new stick will not nest with the trailing fastener of the depleted stick. However, in the event that a corrugated fastener stick of this type should break, prior to usage, at a point in the stick which would present fasteners capable of nesting with the outermost fastener of a depleted or unused stick, a situation is created which can cause a serious jamming condition of the fastener driving device. Thus, if the operator should feed such a partial stick into the magazine so that the leading fastener thereof nested with the trailing fastener in the magazine or the trailing fastener nested with the leading fastener of the next stick to be introduced; in the operation of the device when the nested fasteners reach the drive track, the driver element would engage both nested fasteners and attempt to drive both fasteners through a drive track having dimensions insufficient to accommodate both.

The disadvantage of the alternatively oppositely oriented corrugated fastener stick with respect to stick density can be alleviated by assembling the fasteners in nested relation with all of the corrugations oriented in the same direction. Indeed, the density can be improved as much as 100% with a stick arrangement of this type where the corrugations have a 50% overlap. However, due to the overlap, the feeding and driving of a stick of this type cannot be accomplished by a simple stripping action as is the case with the alternatively oppositely oriented corrugated fastener stick or the conventional staple or T head nail stick.

While there have been many proposals advanced to solve the feeding and driving problems inherently presented in a nested corrugated fastener stick, one method which has achieved a measure of commercial acceptance involves the utilization of stop means in the drive track which serves to engage the outermost corrugation or corrugations of the leading fastener so as to initially position the leading fastener so that it extends only partially within the drive track and the next adjacent fastener is wholly without the drive track. With this arrangement, during the initial portion of the downward movement of the fastener driving element, the portion of the upper surface of the leading fastener extending into the drive track is engaged by the fastener driving element and is moved downwardly therewith to strip it from the remaining fasteners of the stick. During the initial downward movement of the leading fastener with the fastener driving element, the fastener is cammed into longitudinal alignment with the drive track so that as it issues from the end of the drive track it will be in proper alignment beneath the fastener driving element to be moved thereby into the workpiece. Examples of this type of arrangement are disclosed in U.S. Patent No. 3,301,456 and German Patent No. 846,161.

While this general arrangement of feeding and driving a nested corrugated fastener stick has proved satisfactory in operation, as with the alternatively oppositely oriented corrugated fastener stick, orientation problems may be presented as a result of improper orientation of the sticks when loading the magazine assembly. While no solution of this problem is contemplated in the aforesaid German patent, the aforesaid United States patent contemplates solving this problem by providing the stop surface, which serves to engage and initially position the leading fastener partially within the drive track, with a width which is sufficiently larger than the corrugation pitch to contact at least one rib of the leading corrugated fastener irrespective of its orientation. To accommodate this enlarged stop surface an enlarged slot must be cut out of the fastener driving element which materially reduces the contact area which the fastener driving element has with the upper surface of the corrugated fastener during the driving action and renders the same nonsymmetrical.

OBJECTS OF THE INVENTION

It is an object of the present invention to solve the orientation problems noted above with respect to nested corrugated fastener sticks adapted for use in power operated fastener driving devices by providing each corrugated fastener within the stick formation with relatively narrow, substantially flat centrally located end portions for cooperating with spaced relatively narrow stop surfaces positioned adjacent the ends of the drive track in the fastener driving device so as to insure proper initial positioning of the leading fastener partially within the drive track of the device irrespective of the orientation of the corrugations, thus enabling the fastener driving element to have a fastener contacting surface of maximum full rectangular dimensions.

Another object of the present invention is the provision of an improved corrugated fastener package containing a plurality of similarly constructed fasteners assembled and secured into stick formation to be used in power operated fastener driving devices so as to alleviate the orientation problems heretofore encountered while at the same time presenting optimum driving conditions.

These and other objects of the present invention will be more apparent during the course of the following detailed description and appended claims.

DESCRIPTION OF THE DRAWINGS OF THE INVENTION

The invention may best be understood with reference to the accompanying drawings wherein an illustrative embodiment is shown.

In the drawings:

FIGURE 1 is a side elevational view of a corrugated fastener constructed in accordance with the principles of the present invention;

FIGURE 2 is an end view of the corrugated fastener shown in FIGURE 1;

FIGURE 3 is a view looking down on the corrugated faster of FIGURE 1 showing the outline of the upper striking surface thereof;

FIGURE 4 is a view looking up on the corrugated faster shown in FIGURE 1 showing the outline of the lower, sharpened workpiece entering surface thereof;

FIGURE 5 is a top plan view of a partially depleted corrugated fastener stick, embodying the principles of the present invention, and a full corrugated fastener stick, embodying the principles of the present invention, loaded in oppositely oriented condition within the magazine assembly of a fastener driving device, the latter being shown in fragmentary horizontal section; and FIGURES 6, 7 and 8 are fragmentary vertical sectional views of the structure depicted in FIGURE 5 showing the manner in which the leading corrugated fastener is first stripped from the remainder of the fasteners of the stick, second, cammed into full alignment with the drive track and, third, driven into the workpiece, during the drive stroke of the fastener driving element of the fastener driving device.

DETAILED DESCRIPTION OF THE INVENTION

Referring now more particularly to FIGURES 1–4 of the drawings, there is shown therein a corrugated fastener generally indicated at 10, constructed in accordance with the principles of the present invention. In accordance with conventional practice, the corrugated fastener 10 is made of a strip of metal preferably steel or the like having an upper striking edge or surface 12, a lower sharpened work penetrating edge or surface 14 and opposed end edges or surfaces 16 and 18. Formed in the central portion of the strip and extending between the upper and lower edges 12 and 14 is a central rib or corrugation 20 tapered outwardly in a direction from the upper edge to the lower edge. The portions of the strip adjacent the central corrugation 20 are formed into a plurality of ribs or corrugations 22, the corrugations 22 being inclined in a direction parallel to the taper of the central rib or corrugation and providing the main portion of the strip with corrugations which are essentially sinusoidal in cross sectional configuration. While a central tapered corrugation with inclined corrugations extending outwardly therefrom is preferred, it will be understood that in accordance with conventional practice, a straight corrugation of uniform thickness may be utilized as well as other corrugated configurations.

With the centrally tapered, outwardly inclined corrugation construction as shown, the outline of the upper striking surface 12 has a constant pitch sinusoidal configuration as illustrated in FIGURE 3 while the outline of the lower surface 14 includes a central corrugation of greater width or pitch than the remaining corrugations.

Preferably, the number of corrugations provided is sufficient to include at least four ribs on each side of the corrugated fastener and with the construction illustrated, four ribs are presented on one side and five on the other. In this regard, it will be noted that the outermost extremity of the ribs or corrugations of the corrugated fastener are disposed generally within parallel planes indicated at 24 and 26 in FIGURES 3 and 4, which planes define the overall thickness of the corrugated fastener.

In accordance with the principles of the present invention, an essential feature of the present corrugated fastener construction 10 is the provision of relatively narrow, flat, centrally located end portions or sections 28. As best shown in FIGURES 3 and 4, each end portion 28 includes opposed parallel planar stop engaging surfaces 30 which, as shown in FIGURES 3 and 4, are disposed in parallel planes, indicated at 32 and 34, disposed centrally between the planes 24 and 26 so that the plane 32 is spaced from the plane 24 a distance the same as the plane 34 is spaced from the plane 26.

While the centralized flat end portions 28 are shown as extending throughout the height of the corrugated fastener from the upper edge 12 to the lower edge 14, it will be understood that they may be configured to have a height less than the overall height of the corrugated fastener. Moreover, the term "relatively narrow" as applied to the centralized end portions 28 is used herein to designate the minimal extent of the end portions with respect to the overall width of the corrugated fastener. While it is preferable to maintain the width of the end portions 28 to a minimum commensurate with the tolerances sufficient to insure optimum cooperation with the components of the fastener driving device, the maximum size width of each end portion 28 preferably should be less than one half of the corrugation pitch and in actual practice is substantially less. The corrugation pitch is the distance from a point on one corrugation to a corresponding point on an adjacent corrugation measured in the direction of the width of the fastener, for example, the distance between adjacent points of the fastener touching either the line 24 or 26 in FIGURE 3.

The corrugated fastener 10 may be made in accordance with conventional practice by feeding a strip of metal, chamfered along one edge corresponding to the work penetrating lower edge, through a pair of cooperating rotary dies having male and female peripheral corrugations of a configuration to continuously form the strip into a repeating pattern conforming to a single corrugated fastener 10 as described above. After the strip has been corrugated, the lower edge 14 is then sharpened and the strip is sheared from the upper edge to the lower edge and desirably chamfered to insure that the end edges 16 and 18 will be free of burrs or the like.

A specific example of a corrugated fastener embodying the present invention utilizes a .02" thick cold rolled strip steel. The overall thickness of the fastener (i.e., the distance between planes 24 and 26) being .088", the width of the fastener (i.e., the distance between the edges 16 and 18) being 1" and the height (i.e., the distance between the striking surface 12 and work pentrating surface 14) being .750". The work penetrating edge 14 is sharpened at an included angle of 45°, the interior radius of the corrugations is .039" with a pitch of .186" and the central corrugation 20 tapers 2° from the normal to the striking surface. The width of the end portions 28 is .043" adjacent the lower edge 14 and .069" adjacent the upper edge 12.

Corrugated fasteners of heights less than ¾" may be formed on the same pair of cooperating rotary dies by feeding metal strips of less widths centrally to the rotary die. Exemplary alternate heights may include ⅝", ½" and ⅜". With this arrangement, it will be noted that the shorter fasteners are obtained essentially by eliminating an equal amount of metal along both the upper and lower margins of the highest fastener. Thus, the upper striking edge of the shorter fasteners will present an outline which has a center corrugation of slightly greater pitch and the width of the end portions would vary proportionately.

In accordance with the principles of the present invention, a multiplicity of corrugated fasteners 10 are assembled in coextensive row formation with their corrugations oriented in the same direction so that the corrugations of adjacent fasteners in the row formation are nested with respect to each other as shown in FIGURES 5–8. In accordance with the present invention, a plurality of fasteners assembled as aforesaid are secured in assembled relation to form a stick S, by any conventional means as for example an adhesive or the like. In the specific example referred to above, a pitch of .0445" between adjacent nested fasteners is utilized (approximately 50% of the total corrugation thickness or distance between planes 24 and 26) so that a stick of 48 fasteners would have a dimension of approximately 2 3/16". In this regard it will be noted that a plurality of conventional corrugated fasteners of corresponding overall dimensions assembled in alternately oppositely oriented fashion would have only 24 fasteners in a stick of the same length.

While the above is a preferred nesting pitch (the nesting pitch is the distance between corresponding points of adjacent fasteners measured in the direction of row formation), the amount of nesting can be varied so long as the plane 24 of one pair of adjacent fasteners is disposed either coextensive with the plane 32 of the adjacent fastener or in a plane parallel thereto spaced therefrom in a direction toward the plane 34 thereof. Stated differently, adjacent fasteners should not be nested to an extent such that the plane 24 of one fastener is disposed between the planes 24 and 32 of the fastener into which it is nested. The more nearly the amount of nesting approaches coextension of the plane 24 with the plane 32 of the next adjacent fastener, the denser the fastener stick will be.

OPERATION OF THE INVENTION

High density in the fastener stick is desirable when the stick is used for its intended purpose in conjunction with power operated fastener driving devices since it minimizes the downtime in operation necessary to effect reloading. The advantages of the present corrugated fastener stick construction flow primarily from the manner in which the corrugated fasteners 10 of the sticks cooperate with the power operated fastener driving device during operation. These advantages are best understood with reference to FIGURES 5–8 wherein a portion of a conventional power operated fastener driving device modified to accommodate the fastener stick of the present invention is shown.

The portion of the fastener driving device shown includes a magazine 36 of a size to receive therein a fastener stick S embodying the principles of the present invention, a spring pressed pusher 38 of conventional design for effecting a longitudinal feeding movement of the fastener stick S within the magazine 36 toward the discharge end thereof which communicates with an opening 40 formed in a wearplate 42. The opening 40 enters into a drive track 44 which is formed by a groove in a nose piece 46 and the adjacent surface of the wearplate 42. A fastener driving element 48 of rectangular cross sectional configuration is mounted within the drive track 44 for vertical reciprocation through a drive stroke and a return stroke by any conventional power operated mechanism, as, for example, the mechanism disclosed in commonly assigned Patent No. 3,051,135.

As best shown in FIGURE 5, the width of the drive track 44 provided by the groove in the nose piece 46 is slightly less than the width of the opening 40 and the interior dimension of the magazine 36 so as to provide narrow vertically extending stop surfaces 50 at the sides of the magazine outlet. The width of these stop surfaces is slightly less than the minimum width of the centralized flat end portions 28 of the corrugated fasteners 10.

With reference to FIGURE 5 it will be noted that the pusher 38 serves to resiliently urge the leading corrugated fastener of the stick S within the magazine 36 toward the drive track 44 and that the stop surfaces 50 serve to position the leading fastener partially within the drive track and the next adjacent fastener in the stick S wholly without the drive track. The leading fastener is thus presented in a position partially extending into the drive track so that a portion of its upper striking surface 12 will be engaged by the lower surface of the fastener driving element during its downward drive stroke. The engagement of the fastener driving element with the striking surface of the leading fastener serves to move the latter downwardly and hence strip it from the remaining corrugated fasteners of the stick. The wearplate 42 and nose piece 46 are formed so as to cam the leading fastener fully into the drive track in alignment with the fastener driving element during the initial portion of its downward movement with the fastener driving element 48.

This camming function is obtained in the embodiment shown by forming a slot in the leading surface of the wearplate below and in communication with the opening 40 so as to provide an inclined cam surface 52 having a width substantially equal to the width of the drive track 44 and a pair of narrow parallel inclined surfaces 54 at each end thereof having a width generally equal to the width of the associated stop surface 50. In addition, the nose piece 46 is formed with parallel grooves 56 extending inwardly and downwardly from a position spaced above the lower surface of the opening 40 and then vertically downwardly to the lower end of the nose piece adjacent each side of the drive track 44. Each groove 56 has a width generally equal to the width of the associated stop surface 50 and a depth slightly greater than the distance between the planes 32 and 26 (or 34 and 24) of the corrugated fasteners.

Referring now more particularly to FIGURES 6–8, as indicated above, the engagement of the centralized flat end portions 28 with the stop surfaces 50 serve to position the leading corrugated fastener 10 of the stick S within the magazine 36 so that a portion of the striking surface 12 thereof extends into the drive track 44 to be engaged by the lower end of the fastener driving element as it descends during its drive stroke. The relief provided by the inclined surfaces 52 and 54 is such that the work penetrating surface 14 of the leading fastener is unsupported. It will be noted, however, that the relief provided by the inclined surfaces 52 and 54 is such that support is provided for the work penetrating surface 14 of the next adjacent fastener at least at the end portions thereof. Thus, as shown in FIGURE 6, when the lower edge of the fastener driving element 48 engages the portion of the striking surface 12 extending into the drive track 44, the leading corrugated fastener 10 of the stick S will be moved downwardly with respect to the remaining corrugated fasteners and thus stripped from the stick S. As the leading corrugated fastener 10 moves downwardly with the fastener driving element, the inclined surfaces 52 and 54 are engaged by the leading corrugated fastener to effect a tilting forward movement thereof into a position of alignment with the drive track 44 and fastener driving element 48. As shown in FIGURE 7, the relief provided by the grooves 56 permit entry of end portions 28 into the drive track during this camming motion. As shown in FIGURE 8, the leading corrugated fastener 10 is fully aligned with the drive track 44 and the fastener driving element 48 as the fastener is moved outwardly of the drive track and into the workpiece during the final portion of the drive stroke of the fastener driving element.

A significant operator advantage achieved by the corrugated fastener stick S of the present invention is that the stick may be loaded into the magazine 36 without regard to orientation of the direction of corrugation. The centralized position of the narrow flat end portions 28 of each corrugated fastener 10 which is assembled into the stick S insures that each corrugated fastener will be properly positioned with respect to the drive track 44 to be stripped from the stick, cammed into alignment with the drive track and driven into the workpiece during the drive stoke of the fastener driving element 48. FIGURE 5 illustrates the operation when a full corrugated fastener stick S is loaded into the magazine with its corrugations oriented oppositely from the corrugations of a substantially depleted corrugated fastener stick S1. Under these circumstances, the trailing corrugated fastener 10 of the depleted stick S1 will have its trailing ribs in engagement with the leading ribs of the leading corrugated fastener of the full corrugated fastener stick S. When the trailing corrugated fastener 10 of the depleted stick S1 is driven, the leading corrugated fastener 10 of the full stick S will be urged first into engagement with the trailing surface of the fastener driving element 48, when the latter has moved through its drive stroke, and then upon movement of the latter through its return stroke, the leading fastener is resiliently urged into proper position to be stripped, cammed and driven during the next drive stroke of the fastener driving element. This action is possible since the distance between the planes 24 and 32 is substantially equal to the distance of the planes 26 and 34.

It can thus be seen that a plurality of corrugated fasteners 10 embodying the principles of the present invention assembled and secured in nested row formation provides a fastener stick which has optimum density while at the same time presenting optimum operating characteristics in a fastener driving device irrespective of the orientation of the stick when loaded into the magazine of the fastener driving device. By minimizing the width of the centralized flat end portions 28 and hence the width of the stock surface 50, a maximum full rectangular cross-sectionally configured fastener driving element 48 can be utilized providing a maximum surface to surface engagement between the lower striking surface of the fastener driving element and the upper surface of the corrugated fastener which is struck by the fastener driving element. Moreover, it will be apparent that the construction of the corrugated fastener stick S of the present invention simplifies the construction of the portions of the fastener driving device which cooperates with the leading corrugated fastener during the driving operation.

It will thus be seen that the objects of this invention have been fully and effectively accomplished. It will be realized, however, that the foregoing specific embodiment has been shown and described only for the purpose of illustrating the principles of this invention and is subject to extensive change without departure from such principles.

What is claimed is:

1. A fastener package comprising a plurality of similarly constructed fasteners, each of said fasteners comprising a generally rectangular strip of metal having a striking surface and a spaced sharpened work penetrating surface, said strip of metal being bent into a plurality of corrugations extending in a direction between said striking and work penetrating surfaces, the portions of said corrugations disposed outermost on each side of said strip being disposed generally in a pair of outer parallel planes spaced apart a distance substantially greater than the thickness of said strip, said strip having a relatively narrow flat portion at each end thereof providing surfaces on opposite sides thereof disposed in a pair of inner parallel planes positioned between said pair of outer parallel planes such that the distance between adjacent planes of each pair is substantially equal, said plurality of fasteners being assembled in row formation with their striking and work penetrating surfaces and ends in substantial alignment and with their corrugations similarly oriented in abutting nested relation, and means for securing said plurality of fasteners in said assembled row formation.

2. A fastener package as defined in claim 1 wherein the corrugations of adjacent fasteners are nested to an extent such that each outer plane of each inner fastener within the row formation is disposed between the pair of inner planes of an adjacent fastener.

3. A fastener as defined in claim 1 wherein the width of each flat end portion is less than one half the pitch of said corrugations.

4. A fastener package as defined in claim 3 wherein the corrugations of adjacent fasteners are nested to an extent equal to approximately 50% of the distance between the outer planes of each fastener.

References Cited

UNITED STATES PATENTS

| | | | |
|---|---|---|---|
| 3,301,456 | 11/1964 | Schaforth et al. | 227—120 |
| 1,904,288 | 4/1933 | McChesney | 85—11 |
| 2,156,682 | 5/1939 | Dimoush | 85—11 |
| 2,942,267 | 6/1960 | Cusumano. | |
| 2,170,462 | 8/1939 | Putman | 85—11 |

FOREIGN PATENTS 846,161  8/1952  Germany.

MARTHA L. RICE, Primary Examiner

U.S. Cl. X.R.

85—11; 227—120